Aug. 8, 1933.    R. W. GRACE    1,921,746

TEST BLOCK

Filed Sept. 21, 1931

INVENTOR
R.W. Grace
BY
Fraser and Bishop ATTORNEYS

Patented Aug. 8, 1933

1,921,746

UNITED STATES PATENT OFFICE 1,921,746

TEST BLOCK

Richard W. Grace, Canton, Ohio, assignor to The Superior Switchboard & Devices Company, Canton, Ohio, a Corporation of Ohio Application September 21, 1931
Serial No. 564,084

7 Claims. (Cl. 175—183)

The invention relates to test blocks for connecting the line and load wires to electric meters and arranged to cut out the meter and directly connect the line and load wires together for the purpose of testing the meter.

Test blocks such as are ordinarily in common use are mounted upon an insulation base usually provided with a barrier through its center with means upon each side of the barrier for connecting one line and load wire to the meter. This necessitates the crossing of the wires leading from the test block to the meter.

The object of the present improvement is to provide a test block so arranged that the line and load wires may be connected through the meter without the necessity of crossing any wires between the test block and the meter.

Another important object of the improvement is the provision of a jumper bar which in service position normally does not carry current, concealed upon the rear side of the insulation block connected to one of the load terminals and is arranged to be connected as by a removable test link to the corresponding line terminal for the purpose of testing the meter, whereby the test block may be changed from the normal or service position to the testing position without interrupting the current to the consumer.

The above and other objects may be attained by constructing the improved test block in the manner illustrated in the accompanying drawing, in which Figure 1 is a front elevation of the improved test block showing the same in the normal or service position, the wiring and meter being shown diagrammatically;

Similar numerals refer to similar parts throughout the drawing.

Figure 1:
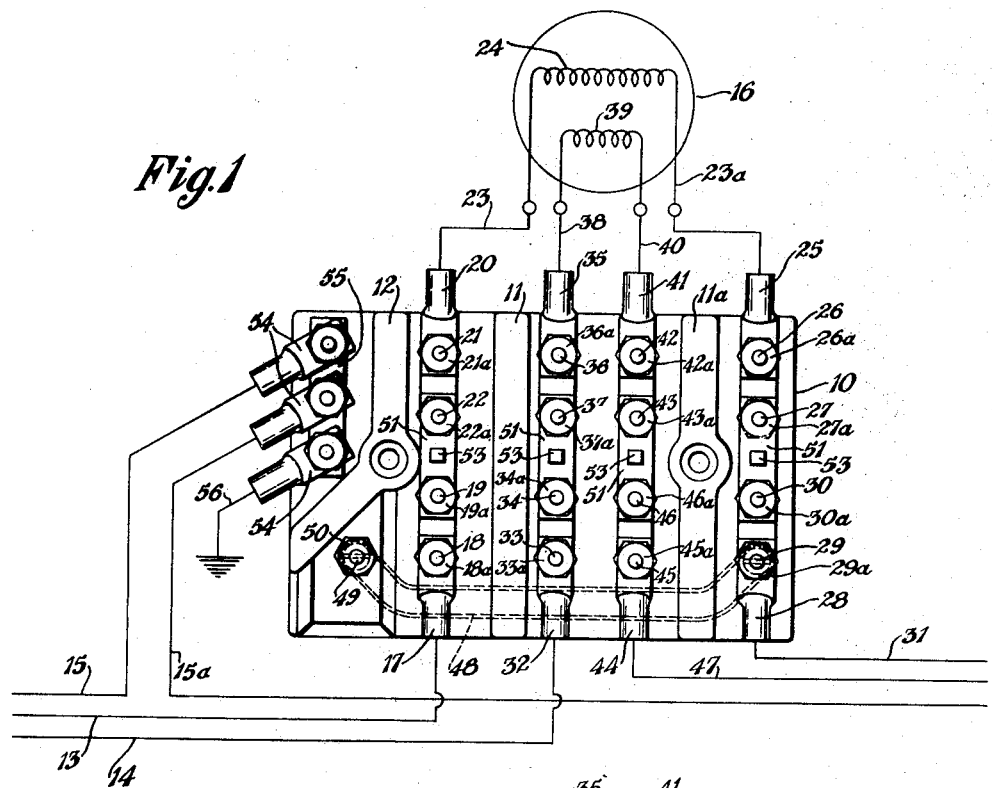

The improved test block to which the invention pertains includes a base 10 of suitable insulation material, provided upon its front, or upper, surface with a spaced pair of barriers 11 and 11a, also preferably formed of insulation material.

If it is desired to mount potential studs upon the block, a third barrier 12, which may be of angular shape, as illustrated, may also be provided upon the front face of the insulation base, and spaced from the barrier 11.

The line wires 13 and 14, and potential wire 15 are shown diagrammatically, as well as the meter, indicated generally at 16 and the wiring connecting the same to the test block, as will be later described.

A line terminal 17 is mounted upon the block 10, outside of the barrier 11, and the line wire 13 may be connected thereto, as shown. A spaced pair of binding posts 18 and 19 may be connected to the terminal 17 and provided with the nuts 18a and 19a respectively.

A meter terminal 20, similar to the line terminal 17, is located in alinement with the terminal 17 at the opposite edge portion of the block 10 and has connected thereto a pair of binding posts 21 and 22 provided with the nuts 21a and 22a respectively.

A wire 23 leads from the terminal 20 to one side of the coil 24 of the meter, the other side of said coil being connected by a wire 23a to a meter terminal 25, similar to the terminal 20 and located upon the block outside of the barrier 11a. This terminal also is provided with a spaced pair of binding posts 26 and 27 provided with the nuts 26a and 27a respectively.

In alinement with the terminal 25, and at the opposite side of the base 10, is located a load terminal 28 having the binding posts 29 and 30 thereon provided with the nuts 29a and 30a respectively. The load wire 31 is connected to the terminal 28.

The line wire 14 is connected to a line terminal 32 located between the barriers 11 and 11a, said terminal being provided with the spaced binding posts 33 and 34 having thereon the nuts 33a and 34a respectively.

The meter terminal 35, provided with the posts 36 and 37, having the nuts 36a and 37a respectively, is located upon the opposite side of the base 10 in alinement with the terminal 32 and is connected by a wire 38 with one side of the meter coil 39, the other side of which is connected by a wire 40 to the meter terminal 41 located adjacent to the terminal 35 and between the barriers 11 and 11a. This terminal also is provided with spaced binding posts 42 and 43 having the nuts 42a and 43a respectively.

The other load terminal 44 is located adjacent to the line terminal 32 and in alinement with the meter terminal 41 and provided with the spaced binding posts 45 and 46 having thereon the nuts 45a and 46a respectively. The load wire 47 is connected to the terminal 44.

Thus it will be seen that the line terminals and load terminals are grouped, and the terminals connected to the meter coil 24 are separated from the terminals connected to the coil 39 by the barriers 11 and 11a, permitting the wires from the meter terminals to lead directly to the coils of the meter without the necessity of crossing any of said wires between the meter and the test block.

A jumper bar 48 is located upon the rear side of the insulation base 10, one end thereof being connected to the post 29 of the load terminal 28 and the other end being connected to a binding post 49 extended through the front face of the insulation base at a point spaced from the post 18 of the line terminal 17, and provided with a nut 50.

Each pair of line and load terminals is connected to the corresponding meter terminal by means of a removable link 51 provided with spaced notches 52 to be received by the inner binding posts of said terminals. For instance, the terminals 17 and 20 are connected by one of these links, the notches therein receiving the binding posts 19 and 22, the nuts 19a and 22a being tightened to clamp the link in tight contact with the terminals.

Figure 2:
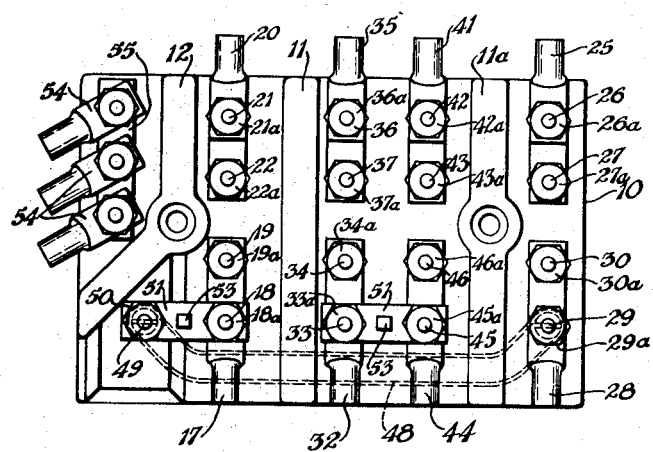
Fig. 2 is a front elevation of the improved test block showing the same in the testing position.
Figure 4:
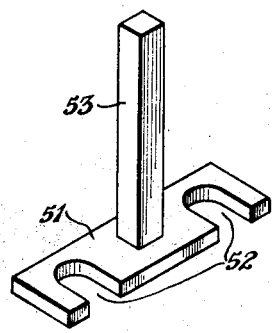
Fig. 4 is a perspective view of one of the links by means of which the device may be changed from the normal or service position to the testing position and vice versa.
Figure 3:
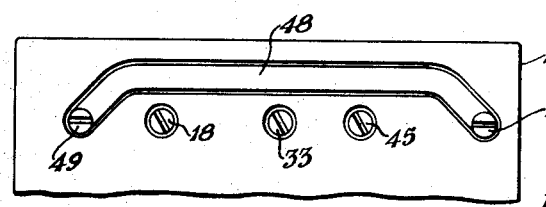
Fig. 3 is a fragmentary rear elevation of the test block showing the concealed jumper bar normally carrying no current.

The posts 18 and 49 are spaced apart the same distance so as to permit one of the links 51 to be placed thereon as shown in Fig. 2. Suitable insulation handles 53 may be provided upon the links for the purpose of easily handling the same.

If desired the potential studs 54 may be mounted upon the insulation base 10 and separated from the above described devices as by the barrier 12. These studs may be electrically connected together as by the bar 55. The potential wire 15 leads to one of said studs, the potential wire 15a being connected to another of the studs and the ground 56 to the third stud.

In the operation of the device with the same in the normal or service position, as shown in Fig. 1, each load and line terminal is connected to its corresponding meter terminal by one of the removable links 51 so that current flows from the line wires through the terminals to the meter and then back through the test block to the load wires. In this position the bar 48 does not carry current since there is no link connecting the posts 18 and 49.

When it is desired to test the meter, an extra link 51, which may be carried for that purpose, is placed upon the posts 18 and 49 as shown in Fig. 2. This connects the line terminal 17 directly to the load terminal 28.

The link 51 connecting the posts 19 and 22 may then be removed, breaking the connection between the line terminal 17 and meter terminal 22 and this link may be placed across the line and load terminals 32 and 44 respectively, being connected to the posts 33 and 45 of said terminals as shown in Fig. 2. This connects the line terminal 32 directly to the load terminal 44.

The other links 51, connecting the terminals 32 and 35, 44 and 41, and 28 and 25 respectively, may all be removed, leaving the block in the position shown in Fig. 2 with each line terminal connected directly to the corresponding load terminal and all of the meter terminals disconnected from the corresponding line and load terminals, leaving the consumer's current undisturbed while the meter is cut out of the circuit for the purpose of testing.

A test block constructed and operated as shown herein provides load, line and meter terminals which are all accessible at the upper surface of the test block all of which carry current when the device is in service position; so that no concealed parts carry current when the device is in service position. With this arrangement of parts, all current carrying parts in service position are accessible and visible so that their condition may be quickly determined. Likewise, when the device is in test position the only concealed part carrying current is the concealed jumper bar 48.

I claim:

1. A meter test block including an insulation base, a grouped pair of line terminals thereon, a grouped pair of load terminals spaced from the line terminals, meter terminals normally connected to the line and load terminals, a jumper bar below the base leading from one of the load terminals to a point adjacent to one of the line terminals, and means for connecting said jumper bar to the last mentioned terminal.

2. A meter test block including an insulation base, a grouped pair of line terminals thereon, a grouped pair of load terminals spaced from the line terminals, meter terminals normally connected to the line and load terminals, a jumper bar below the base leading from one of the load terminals to a point adjacent to one of the line terminals, and a link for connecting said jumper bar to the last mentioned terminal.

3. A meter test block including an insulation base, a grouped pair of line terminals thereon, a grouped pair of load terminals spaced from the line terminals, meter terminals normally connected to the line and load terminals, a jumper bar below the base leading from the outside load terminal to a point adjacent to the outside line terminal, and means for connecting said jumper bar to the outside line terminal.

4. A meter test block including an insulation base, a grouped pair of line terminals thereon, a grouped pair of load terminals spaced from the line terminals, meter terminals normally connected to the line and load terminals, a jumper bar below the base leading from the outside load terminal to a point adjacent to the outside line terminal, and a link for connecting said jumper bar to the outside line terminal.

5. A meter test block including an insulation base, a grouped pair of line terminals thereon, a grouped pair of load terminals spaced from the line terminals, meter terminals normally connected to the line and load terminals, a stud adjacent to the outside line terminal, a jumper bar below the base leading from the outside load terminal to said stud, and a removable link for connecting the outside line terminal to said stud.

6. A meter test block including an insulation base, a grouped pair of line terminals on the base, a grouped pair of load terminals on the base, a terminal near the outside line terminal, and a jumper bar below the base connecting the outside load terminal to said near terminal.

7. A meter test block including an insulation base, a grouped pair of line terminals on the base, a grouped pair of load terminals on the base, a terminal near the outside line terminal, a jumper bar below the base connecting the outside load terminal to said near terminal and means for connecting said near terminal to the outside line terminal.

RICHARD W. GRACE.